United States Patent
Kelley

(10) Patent No.: US 7,339,722 B2
(45) Date of Patent: Mar. 4, 2008

(54) HYBRID NONLINEAR OPTICAL CONVERSION AND OPTICAL PARAMETRIC OSCILLATION

(75) Inventor: Sean Patrick Kelley, Bloomingdale, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/473,448

(22) Filed: Jun. 23, 2006

(65) Prior Publication Data
US 2007/0297033 A1 Dec. 27, 2007

(51) Int. Cl.
*G02F 1/35* (2006.01)
*G02F 2/02* (2006.01)

(52) U.S. Cl. .................... 359/330; 359/326
(58) Field of Classification Search ......... 359/326–332
See application file for complete search history.

(56) References Cited

U.S. PATENT DOCUMENTS

| | | | |
|---|---|---|---|
| 5,117,126 A * | 5/1992 | Geiger ................ 359/330 |
| 5,311,352 A | 5/1994 | Bierlein et al. |
| 5,504,616 A | 4/1996 | Shinozaki et al. |
| 6,215,800 B1 * | 4/2001 | Komine ................ 372/22 |
| 6,304,585 B1 | 10/2001 | Sanders et al. |
| 2005/0008046 A1 | 1/2005 | Vodopyanov et al. |

* cited by examiner

*Primary Examiner*—Kevin Wood
*Assistant Examiner*—John M Bedtelyon
(74) *Attorney, Agent, or Firm*—Tarolli, Sundheim, Covell & Tummino LLP

(57) ABSTRACT

A nonlinear frequency conversion system includes a first element including a first medium configured to perform type II birefringent phase matching (BPM) of a pump beam to provide corresponding seed beams having at least first and second polarization states. A second element includes a second medium configured to perform quasi phase matching (QPM) of the seed beams. The second element amplifies at least one of the seed beams to provide corresponding output beams, and at least one of the output beams has a predetermined wavelength that is different from the wavelength of the pump beam. The nonlinear frequency conversion system can be implemented in an optical resonator to provide an optical parametric oscillator.

23 Claims, 5 Drawing Sheets

HYBRID NONLINEAR OPTICAL CONVERSION AND OPTICAL PARAMETRIC OSCILLATION

TECHNICAL FIELD

The present invention relates to optical systems and methods and, more particularly to hybrid nonlinear optical conversion and optical parametric oscillation.

BACKGROUND

Not all wavelength regions of interest are directly accessible with lasers. Therefore, one or more laser beams of known wavelengths can be converted by the use of optical nonlinearities in one or more media to generate light with other wavelengths. For example, optical parametric oscillation can perform nonlinear conversion on commonly available laser sources to achieve optical power in the infrared. An optical parametric oscillator (OPO) is a coherent optical light source that operates based on nonlinear optical gain resulting from parametric amplification. This is in contrast to a laser that operates by stimulated emission in which incoming radiation can stimulate an excited laser ion to emit a photon into its own mode. An OPO device can consist of one or more nonlinear gain media contained within a resonant cavity that includes a partially reflecting output mirror to out-couple a portion of the newly generated light, while providing enough feedback to produce oscillation.

Various types of transparent crystalline materials can exhibit different kinds of optical nonlinearities associated with higher order complex nonlinear polarization components. Frequency conversion is one consequence of higher order polarization components. Difference frequency generation (DFG), a second order effect, is the fundamental process exploited in an OPO. Within the non-linear medium the parent laser beam induces a driving polarization wave, which generates two new beams called 'signal' and 'idler'. The resonant signal interacts with the driving polarization to set up an idler polarization at the difference frequency. The difference in phase velocity between the uncoupled freely propagating idler field and the driving polarization due to material dispersion causes a relative phase slip along the propagation direction. Because of this relative phase slip, the direction of energy flow between the idler and driving polarization oscillates as they propagate through the material. Hence, the generated fields can not grow continuously. The physical distance over which power flows positively from the driving wave to the signal and idler is called a coherence length $L_c$. Phase matching techniques can be used to compensate for the phase slip and increase the effective coherence length to encourage positive energy flow from the pump beam to the signal and idler. Increasing the coherence length allows the oscillating signal field to grow as it constructively interacts with the pump's driving polarization over longer distances.

As one example, birefringent crystals can be used as nonlinear gain media, satisfying the phase matching condition to convert in the infrared through the process of birefringent phase matching (BPM). The two main categories of operation for BPM devices are Type I and Type II. Type I phase matching generates two parallel polarized beams called 'signal' and 'idler', which are orthogonal to the parent beam polarization. Type II phase matching generates one beam with polarization parallel to the source beam, and another beam that is orthogonal to the source beam.

Quasi-phase matching (QPM) is a technique of using spatially modulated nonlinear properties of a gain medium. By periodically rotating the crystal orientation about the appropriate propagation axis by $\pi$ every coherence length, QPM also reverses the non-linearity and compensates for the phase slip. The waves are then phase matched for efficient conversion. A QPM crystal can be engineered to exploit its highest nonlinearity, while avoiding walk off due to non-critical phase matching which occurs in critically phase matched BPM materials. The operating wavelengths of QPM materials can also be engineered and tuned over a wide range of wavelengths.

Many applications require narrow linewidths that are technically not commercially feasible with many OPO or laser devices, including those implementing Type I BPM or QPM. For example, narrow linewidths are often required for pump sources for nonlinear processes, for light sources for various kinds of fiber optic sensors, for spectroscopy, in coherent optical fiber communications, and for test and measurement.

SUMMARY

The present invention relates to optical systems and methods and, more particularly to hybrid nonlinear optical conversion and optical parametric oscillation.

One aspect of the present invention provides a nonlinear frequency conversion system that includes a first element configured to perform type II birefringent phase matching (BPM). The first element can include a weakly converting medium that performs BPM to convert a pump beam into a corresponding narrow linewidth seed signal resulting from DFG. A second element includes a medium configured to perform quasi phase matching (QPM), such as using the transmitted parent laser beam and being seeded by the seed signal generated in the first element. The second element amplifies the seed beam to provide a corresponding output signal beam. The second element also generates a corresponding idler beam of identical polarization, and both output beams (signal and idler) have a predetermined wavelength that is different from the wavelength of the pump beam. The nonlinear frequency conversion system can be implemented in a configuration such that both elements are contained within an optical resonator to provide an optical parametric oscillator.

Another aspect of the present invention provides an optical parametric oscillator that includes an optical resonator having an input and an output, a pump beam being provided to the input of the optical resonator. At least one type II birefringent phase matching (BPM) crystal can be located within the optical resonator and be configured to provide corresponding BPM output beams having at least first and second polarization states in response to the pump beam. Walk off compensation can be performed to align the BPM output beams co-linearly. A quasi phase matching (QPM) crystal is also located within the optical resonator and seeded by the BPM generated signal beam. The QPM crystal amplifies the BPM signal beam to provide a corresponding QPM output signal beam, and generates a corresponding idler beam, and at least one of the QPM output beams propagates through the output of the optical resonator as at least one amplified output beam having a predetermined wavelength that is different from the pump beam.

Yet another aspect of the present invention provides a method for providing optical parametric oscillation within an optical resonator. The method includes receiving a pump beam having a pump wavelength. Type II birefringent phase matching is performed on the pump beam to provide corresponding BPM output beams having at least first and second polarization states, at least one of the BPM output beams having a predetermined wavelength. Quasi phase matching is performed to amplify at least one of the BPM output beams to provide corresponding QPM output beams. At least one beam of the QPM output beams being provided from the optical resonator as an amplified output beam having a predetermined wavelength that is different from the pump beam.

DETAILED DESCRIPTION

The present invention relates to a system and method that can convert an input source into a narrow linewidth of high spectral brightness.

Figure 1:
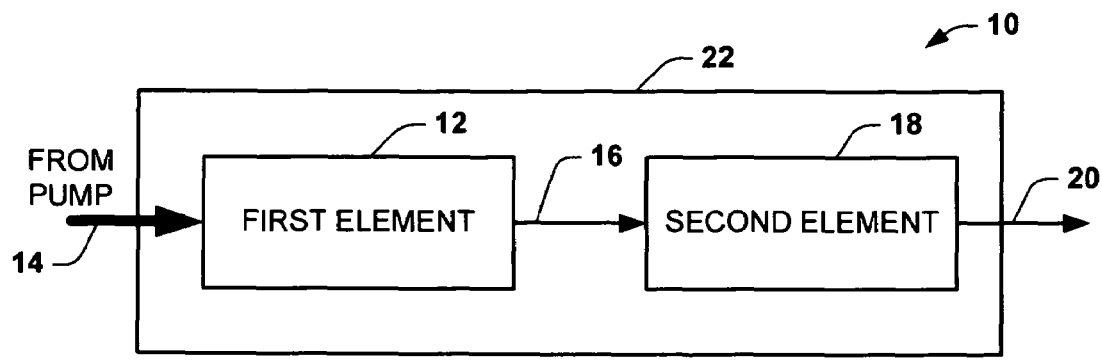
FIG. 1 depicts an example of a nonlinear optical parametric conversion system in accordance with an aspect of the present invention.

FIG. 1 depicts a block diagram of a nonlinear frequency conversion system 10 that can be implemented in accordance with an aspect of the present invention. The system 10 includes a first element 12 that employs type-II birefringement phase matching (BPM). As used herein, BPM is a technique to obtain phase matching for a nonlinear process by exploiting the birefringence properties of an optically transparent nonlinear material (e.g., a nonlinear crystalline material). Type-II phase matching means that the two newly generated beams resulting from difference frequency generation (DFG) have different polarization directions (e.g., one beam with polarization parallel to the parent beam, and another orthogonal to the parent beam). This may be contrasted with type-I phase matching in which the two resulting beams have the same polarization (both of which are orthogonal to the parent beam polarization).

The first element 12 thus is configured to perform type II BPM of an input pump beam 14 and to provide corresponding output beams 16. The output beams 16 have at least two different wavelengths that differ from the pump wavelength. The wavelengths of the output beams 16 result from nonlinear (e.g., second order or higher) optical effects resulting from the nonlinear medium through which the pump beam 14 has passed. For instance, the output beams 16 can include a signal beam and an idler beam having different polarization states (e.g., one beam with polarization parallel to the pump beam 14, and another orthogonal to the pump beam) and a pump beam. Due to the uncoupled polarization states of the signal and idler beams, the linewidth of the output beams 16 can be much narrower, even at or near degenerate wavelengths, than the linewidths provided by type-I BPM. For example, when type-I BPM is operated near degeneracy, a linewidth broadening behavior becomes more pronounced.

As mentioned above, the type II BPM can be implemented by a nonlinear transparent crystalline material that exhibits birefringence properties. Examples of suitable type II BPM materials include potassium titanyl phosphate (KTP), (KTiOPO$_4$), KTA (KTiOAsO$_4$), RTP (RbTiOPO$_4$) and RTA (RbTiAsPO$_4$). For purposes of simplicity of explanation and for sake of consistency, many of the examples described herein will assume the use of potassium titanyl phosphate (KTP) as the nonlinear crystal material used to provide the first (BPM) element 12. Those skilled in the art will understand other types of materials that can be employed to implement type-II BPM processes based on the teachings contained herein.

A single type II BPM crystal exhibits spatial walk off for one of the respective signal and idler components of the output beams 16. The first element 12 can implement walk off compensation, such as by employing a pair of type II BPM crystals arranged to compensate for such spatial walk off of the respective signal and idler components. Walk off compensation can maintain substantial co-linearity of the corresponding output beams 16. By performing such walk off compensation, the narrow linewidth output beams 16 can be provided collinearly having a narrow aggregate linewidth (e.g., less than 1.0 nm). As used herein, the linewidth refers to the full-width-half-max (FWHM) span of the spectral intensity distribution, such as measured in nanometers (nm), of the emitted electric field of one or more beams.

The system 10 includes a second element 18 that is seeded by one of the output beams 16 from the first element 12. The output beams 16 will also include the parent pump beam 14 that is provided to the input of the first element 12. The linewidths that the type II BPM materials of the first element 12 can produce are very desirable; however, the nonlinear coefficient ($d_{eff}$) of such materials is low, which increases threshold and decreases conversion efficiency. Accordingly, the second element 18 can be implemented as including a nonlinear transparent medium that employs quasi phase matching (QPM) as seeded and pumped by the output beams 16. As used herein, QPM relates to a technique to achieve phase matching of nonlinear interactions, but by employing a material with spatially modulated nonlinear properties. The second element 18 thus can perform nonlinear conversion and amplification of the corresponding output beams 16 with a high $d_{eff}$ (corresponding to high a gain factor) and without spatial walk off to provide corresponding output beams 20 that include a predetermined wavelength.

The second element 18 can include a nonlinear crystal arranged to have a propagation direction along the crystal axis. The second element 18 can be engineered to exploit its highest nonlinearity, while avoiding walk off due to non-critical phase matching. The operating wavelengths of the second element 18 can also be engineered, and temperature tuned over a wide range of wavelengths. For most QPM materials, the generated beams are of identical polarization as the parent beam, and the acceptance angle is usually larger than that for Type II BPM materials.

One technique for generating QPM crystals is periodic poling of ferroelectric crystal materials. Examples of QPM crystals that can be engineered (e.g., by periodic poling) for use in the second element 18 include lithium niobate (LiNbO$_3$), lithium tantalate (LiTaO$_3$), gallium arsenide (GaAs) to name a few. For example, a strong electric field can be applied to the crystal for a predetermined duration, such as by using microstructured electrodes, so that the crystal orientation and thus the sign of the nonlinear coefficient is permanently reversed only below the electrode fingers. The poling period (the period of the electrode pattern) and temperature of the material determine the wavelengths for which certain nonlinear processes can be quasi-phase-matched. Those skilled in the art will understand and appreciate various other materials that can be fabricated in periodically poled (orientation-patterned) form for performing QPM, many of which can be employed to provide the second element 18. Techniques other than periodic poling can also be utilized to fabricate a QPM material that can be implemented as the second element 18. For purposes of consistency and ease of explanation, many examples in the following discussions assume the use of periodically poled LiNbO$_3$ (PPLN) crystals as the QPM element 18, although other periodic materials can be used. The nonlinear coefficient ($d_{eff}$) exploited in PPLN is the largest value of $d_{33}$ for polarization along the $\hat{z}$ axis and propagation along the $\hat{x}$ axis.

According to an aspect of the present invention, the second element 18 can be configured (e.g., PPLN having a predetermined grating period and temperature tuned) to perform nonlinear conversion and amplification of the beams 16 in the near to mid-infrared wavelength (e.g., in a range from about 1.0 µm to about 5.0 µm). As described herein, the BPM element 12 can seed the QPM element 18 with substantially co-linear output beams (e.g., the signal and idler beams) 16 having a sufficiently narrow linewidth such that the amplification and associated broadening still produces the output beam 20 with a narrow linewidth (e.g., less than about 1 nm). The performance of the second element 18 further can be tuned by adjusting its axial length and by temperature tuning.

The system 10 can be constructed as a "hybrid" optical parametric oscillator (OPO) in which the first and second elements 12 and 18 are co-located within an optical resonator (or cavity), schematically depicted at 22, for performing optical parametric oscillation. Those skilled in the art will understand and appreciate various configurations of optical resonators that can be used. The optical resonator 22 is configured to be resonant for at least one wavelength of the corresponding output beams 20 (e.g., the signal beam) so that the generated beams circulate to amplify the intra-cavity resonant intensity and resulting output beams 20. Because of the relative properties (e.g., $d_{eff}$, conversion efficiency) of the respective elements 12 and 18, the hybrid OPO can operate at a threshold that approximates the threshold of the QPM element 18 and still provide the output signal with linewidth that is comparable to that of the Type II BPM element 12.

Figure 2:
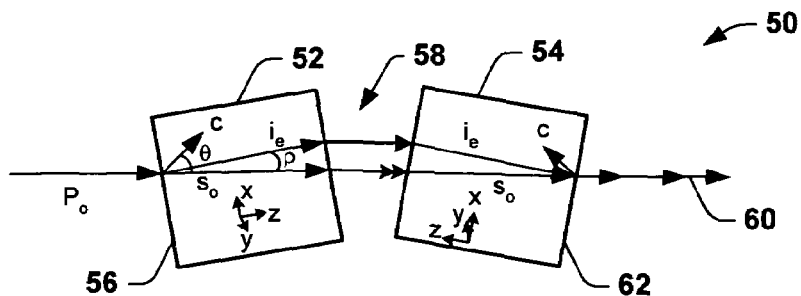
FIG. 2 depicts an example of a BPM element that can be implemented in accordance with an aspect of the present invention.

FIG. 2 depicts an example of a type II BPM element 50 that can be employed in a hybrid OPO implemented according to an aspect of the present invention. The BPM element 50 includes a first type II BPM crystal 52 and a second type II BPM crystal 54, which can be the same materials. For example, the type II BPM crystal can selected from the KTP family of crystals, although other Type II BPM crystals can be used. A pump beam P$_o$ is provided (e.g., by a single frequency or multimode laser) at a predetermined pump wavelength to the input face 56 of the first crystal 52. For example, the pump beam P$_o$ can be provided with spectral linewidth that is below or near to the spectral acceptance bandwidth of the BPM crystal 52. The first crystal 52 performs nonlinear conversion of the pump beam P$_o$ and provides corresponding output beams 58 to the second crystal 54. The first and second crystals 52 and 54 are configured such that the output beams 58 from the first crystal 52 have substantially identical polarizations to those that will be generated and amplified in the second crystal 54 to produce output beam 60.

In the example of FIG. 2, the extraordinary (e) plane is defined by the beam propagation vector and the ĉ axis of the crystal. In this case, the XZ plane is the ê plane. The incident pump beam P$_o$ propagates through the first crystal 52 with a polarization that is ô, or in the YZ plane. The first crystal 52 produces the output beams 58 as including one ô beam and one ê beam. Tuning can be achieved by rotating the crystal in the ê plane about the Y axis, thus changing the internal angle between the crystal ĉ axis and the beam propagation direction. In the illustrated example, the idler beam is polarized in ê (indicated at i$_e$) and the signal beam is polarized in ô (indicated at S$_o$). It is appreciated that different polarizations for different wavelengths can be achieved by angle tuning as well as by employing other tuning techniques (e.g., temperature tuning) on the first crystal. In the type II BPM crystal 52, walk-off occurs continuously as the idler beam is generated, creating a beam propagating at an angle relative to the pump beam P$_o$, and with a continually increasing width.

Since it is desirable to have all three beams co-linear, the first and second crystals 52 and 54 can be implemented in walk off compensation (WOC) configuration, such as shown in FIG. 2. WOC also increases the interaction volume from the case of two identically orientated crystals. By way of example, WOC can be achieved by the second crystal being rotated about the X axis so that $d_{eff}$ has the same sign as the first crystal, but the walk-off direction is exactly opposite. Such an arrangement can be utilized to bring all three beams (P$_o$, i$_e$, s$_o$) to propagate co-linearly as the output beam 60 at the exit face 62 of the second crystal 54 provided that both crystals 52 and 54 are of the same length and identical angular cut. While, for purposes of example and simplicity of illustration, the two crystals 52 and 54 are depicted as being spaced apart, the WOC crystals can be constructed as a single-piece structure (e.g., by diffusion bonding) if the geometry of the crystal is designed such that the pump beam enters and exits normal to each crystal entrance and exit face.

Figure 3:
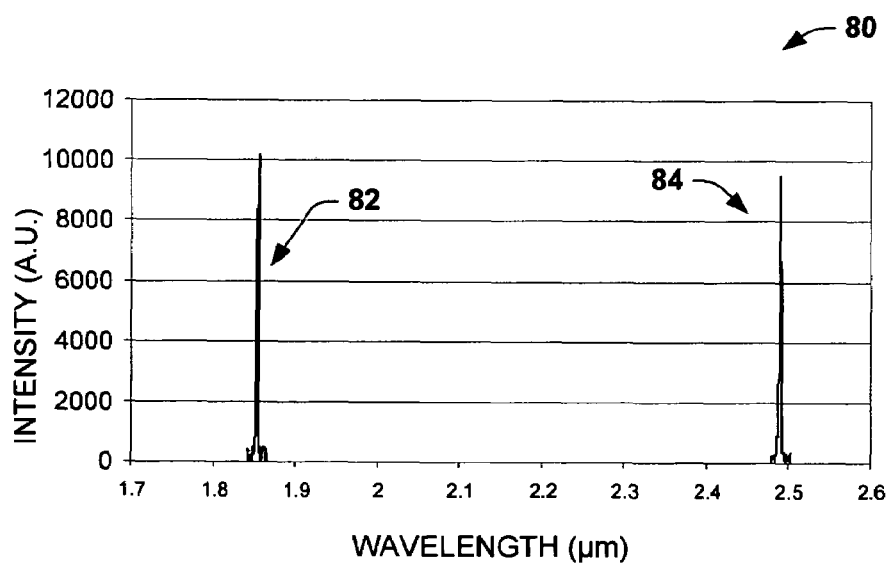
FIG. 3 is a graph depicting an example of bandwidth of output signals from a BPM element of the OPO of FIG. 2.

FIG. 3 depicts a graph 80 depicting an example of linewidths of output beams 82 and 84 from a type II BPM crystal, such as the outputs 58 from the first BPM element 52 shown in FIG. 2. The linewidths of the respective outputs 82 and 84 are narrow. For example, from a 1064 nm pump laser, a typical type II BPM (e.g. KTP) crystal generates signal and idler beams 84 and 82 with linewidths that are less than about 1.0 nm. In the example of FIG. 3, the output 82 has a wavelength of approximately 1.85 µm and corresponds to the idler portion in the ê plane. The output 84 has a wavelength of approximately 2.5 µm and corresponds to the signal portion in the ô plane.

Figure 4:
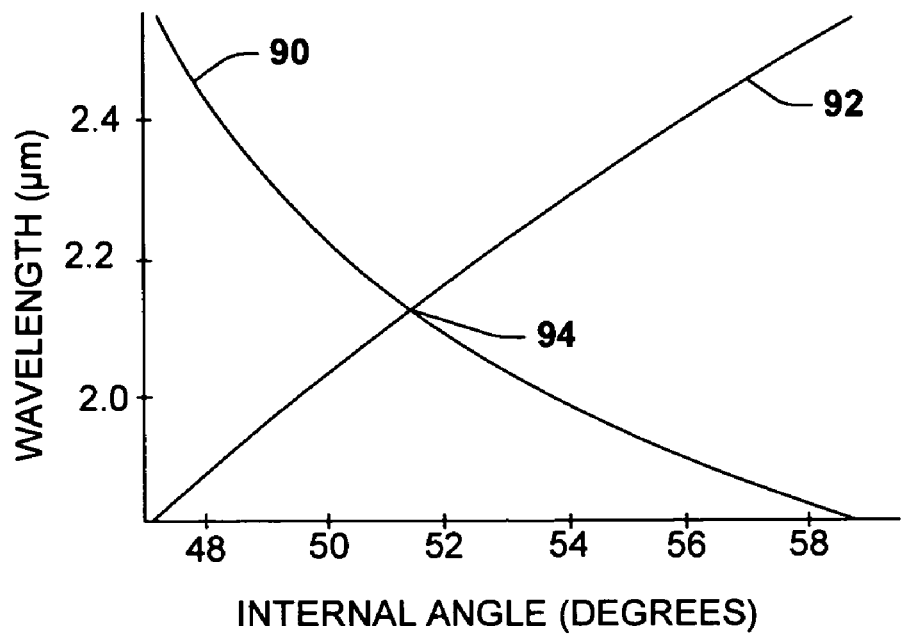
FIG. 4 is a graph of wavelength versus internal angle for signal and idler beams provided by a BMP crystal.

The wavelength of the signal and idler beams output from the type II BPM crystal vary as a function of the internal angle of the beam propagation vector to the crystal axis. As an example, FIG. 4 is a graph depicting wavelength as a function of angle for a type II KTP crystal. Which wavelength is in the ê plane 92 and which is in the ô plane 90 depends on the internal angle of the crystal axis relative to the pump beam (see, e.g., FIG. 2). As shown in FIG. 4, there is a point of degeneracy, indicated at 94, at which the two wavelengths are identical.

Figure 5:
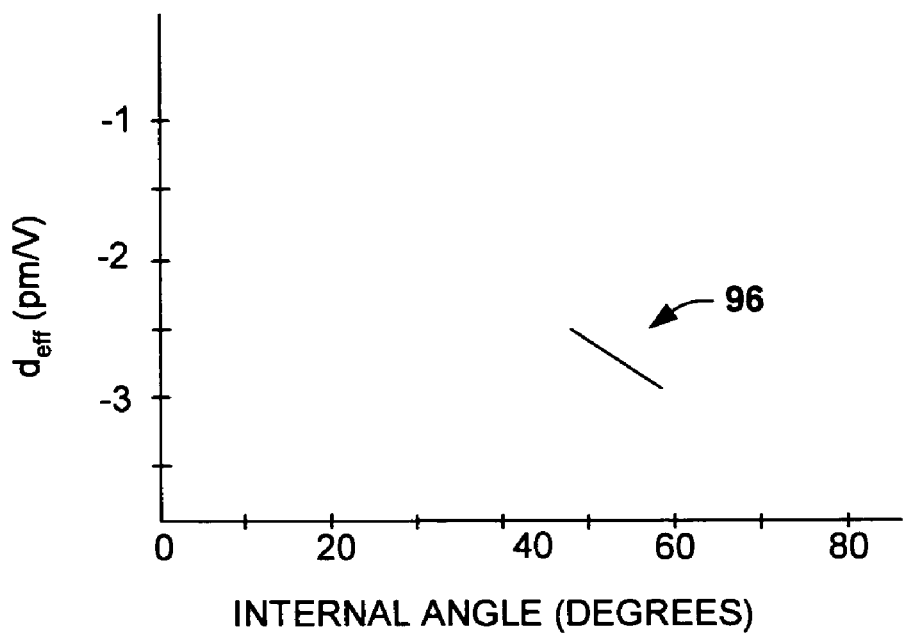
FIG. 5 is a graph depicting how a nonlinear coefficient of a BPM crystal changes as a function of the internal angle.

As mentioned above, being unable to exploit highest nonlinear coefficient ($d_{eff}$), type II BPM crystals have conversion efficiency ($d_{eff}$) that is relatively low as compared to the conversion efficiency that can be achieved by a QPM crystal (e.g., the QPM element 18 of FIG. 1). By way of example, FIG. 5 depicts a graph 96 of the magnitude of $d_{eff}$ plotted as a function of crystal angle for a type II KTP crystal. From FIG. 5, the $d_{eff}$ ranges for the type II KTP crystal ranges from about −2.5 pm/V to about −3.0 pm/V. Thus, while the linewidths which Type II KTP produces can be substantially narrow (e.g., less that about 1 nm—see FIG. 3), the $d_{eff}$ is low (see, e.g., FIG. 5). Such characteristics are common to other type II BPM materials that can be utilized in the near IR (NIR). The low nonlinear coefficient of these and other type II BPM crystals increases the threshold and decreases conversion efficiency. The threshold corresponds to a point at which the small-signal gain equals the cavity losses, such that the threshold defines an input power below which there is negligible output power.

As discussed above, an aspect of the present invention employs a QPM nonlinear material, such as PPLN, in conjunction with the type II BPM to provide a hybrid OPO having desired properties of narrow linewidth (from the type II BPM element) and high conversion efficiency or gain (from the QPM element). As mentioned above, QPM materials offer a solution to the problem of low gain and undesirable walk-off that is associated with the type II BPM element.

By way of further example, the periodicity and temperature of PPLN determine the phase matched interaction according to the following formula:

$$\Lambda(\lambda_p, \lambda_s, \lambda_i, T) = \Gamma(T)^{-1} \left[ \frac{n_e(\lambda_p, T)}{\lambda_p} - \frac{n_e(\lambda_s, T)}{\lambda_s} - \frac{n_e(\lambda_i, T)}{\lambda_i} \right]^{-1}$$

where $\Lambda$ is the grating period;

$\Gamma$ is the coefficient of thermal expansion;

T is temperature in ° C.;

$\lambda_p$, $\lambda_s$ and $\lambda_i$ are the pump, signal and idler wavelengths, respectively; and $n_e$ is the extraordinary refractive index for a particular $\lambda$ Thus, the output of the QPM material can be engineered by poling with the appropriate periodicity to produce a desired wavelength at a particular temperature.

Figure 6:
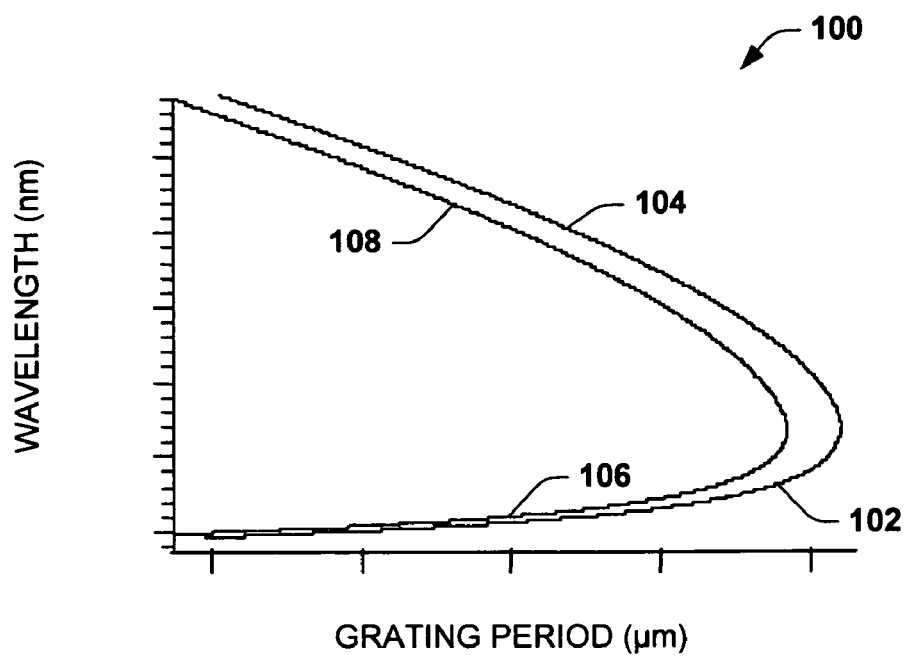
FIG. 6 is a graph depicting a comparison of signal and idler beams in a QPM crystal as a function of grating period for different temperatures.

FIG. 6 depicts examples of period tuning curves 100 in which the grating period for a PPLN crystal is plotted relative to wavelength. In the example of FIG. 6, the grating curves 100 include curves 102 and 104 for the signal and idler, respectively, for PPLN at a temperature of approximately 100° C. Also shown are curves 106 and 108 for the signal and idler, respectively, for PPLN at a temperature of approximately 200° C. After the poling period has been set at a particular temperature, the crystal can be temperature tuned (e.g., by heating) about that to vary the phase matched interaction accordingly.

Because QPM crystals, such as PPLN, provide three output beams (e.g., the signal, idler and pump beams) having the same polarization, the problem of large bandwidth output from PPLN occurs just as in type I BPM crystals. That is, the linewidths (or bandwidths) of the nonlinearly generated output beams typically possess a much broader wavelength spectrum in comparison to the output signals generated by type II BPM crystals.

Figure 7:
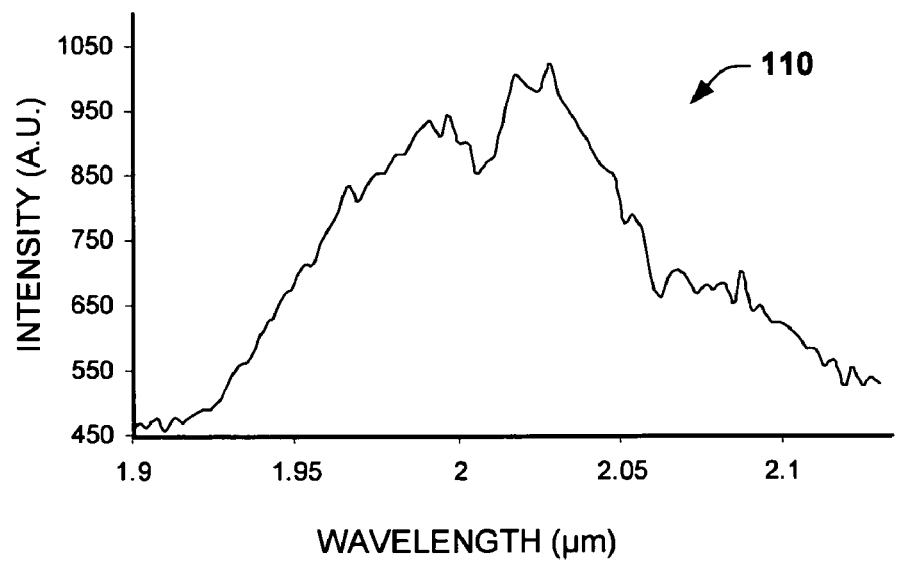
FIG. 7 is a graph depicting an example of spectral bandwidth available from a QPM element of the OPO of FIG. 2 seeded by a traditional pump source.

By way of example, FIG. 7 depicts a graph 110 of output intensity (in arbitrary units) as a function of wavelength for PPLN nearing degeneracy when pumped by a 1064 nm pump laser and having a poling period of about 31.3 µm and operating at a temperature of about 117° C. From FIG. 7, the bandwidth of the signal 110 is approximately 100 nm. This is significantly greater than the output from the type II BPM crystal shown with respect to FIG. 3, where the signal and idler each have linewidths less than 1 nm. Therefore, by implementing an OPO that includes a QPM crystal that is seeded by the narrow linewidth output from a type II BPM crystal, the naturally broad gain bandwidth and large output energy of the QPM crystal effectively collapses into the seed bandwidth at the seed wavelength. The relative gains of the BPM and QPM elements can be balanced to operate the OPO at a threshold that approximates the threshold of the QPM element.

As mentioned above with respect to FIG. 1, the threshold of the QPM element is significantly less than a typical type II BPM element (element 12). By walk off compensation and precise selection of crystal lengths, the individual gains of elements 12 and 18 can be balanced such that an adequate number of seed photons are created to effectively seed the high gain PPLN. From FIG. 2, proper lengths for crystals 52 and 54 can be selected to ensure maximum conversion efficiency, considering the walk off angle ρ for the chosen wavelengths and the spatial beam waist radius $\omega_{0p}$ of the pump beam within the crystals. The crystal length $L_c$ can be chosen to match the interaction length as $$L_c = \frac{\sqrt{\pi} \cdot \omega_0}{\rho}.$$

More than a single pair of WOC Type II BPM crystals may be used to increase the production of seed photons, but at the expense of a longer resonant cavity 22. The BPM crystals 52 and 54 can also be positioned in other configurations with respect to the QPM crystals. For instance, the BPM crystals 52 and 54 can be positioned between the QPM and an output coupler such that the BPM crystals comprise the second element 18 and the QPM crystal comprises the first element 12 in the example of FIG. 1. Other configurations with separated BPM crystals placed on either side of a QPM crystal can also be done. These configurations will change the seeding effectiveness and spectral-temporal output pulse content. For sake of convenience and ease of explanation, a pair of WOC Type II BPM crystals are depicted in the examples shown herein (e.g., FIGS. 2 and 8) to provide the type II BPM element. Thus, an OPO implemented according to an aspect of the present invention can provide tunable narrow linewidth output with high spectral brightness at a desired wavelength, such as in the infrared region.

Figure 8:
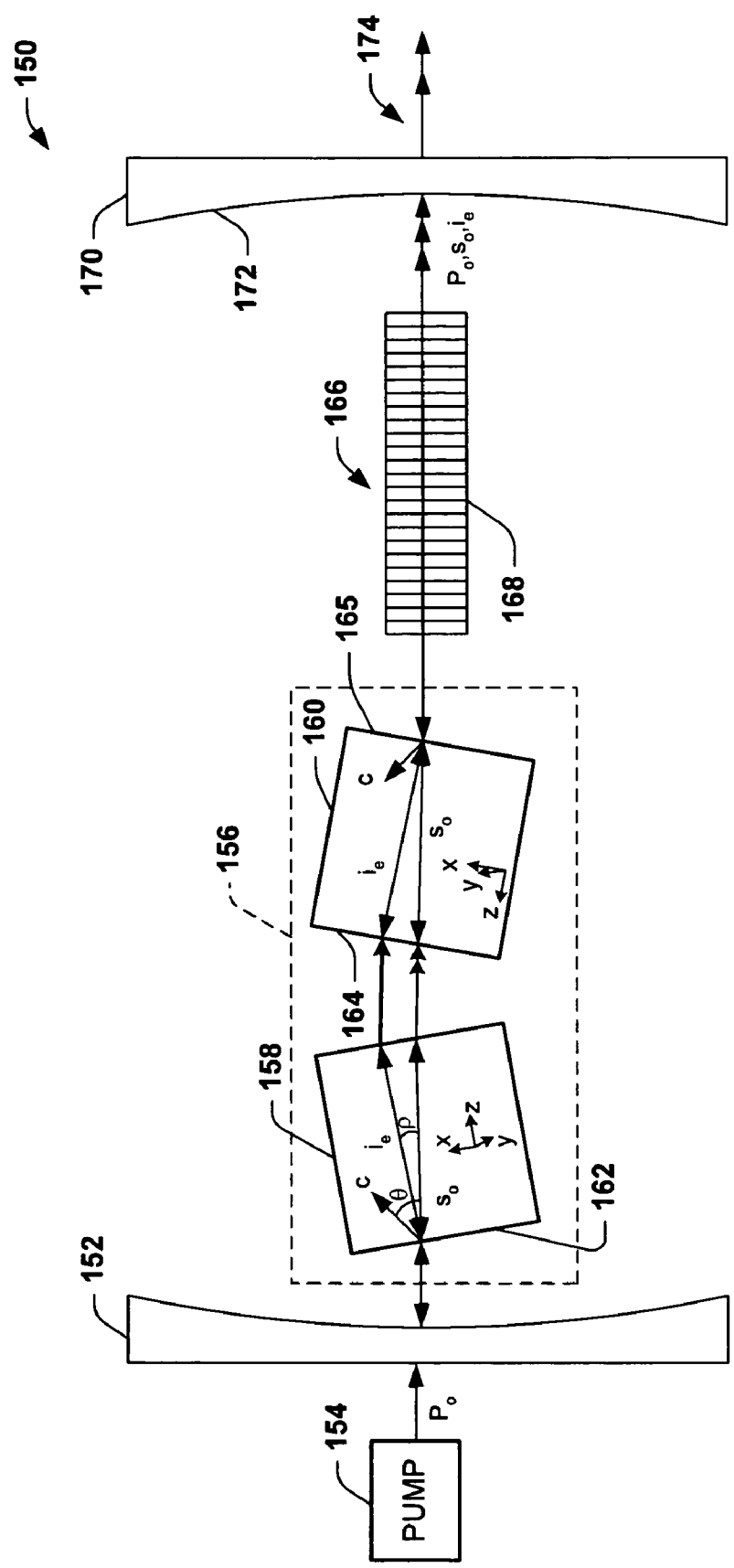
FIG. 8 depicts an example of a hybrid OPO that can be implemented according to an aspect of the present invention.

FIG. 8 depicts an example of a hybrid OPO system 150 that can be implemented according to an aspect of the present invention. The OPO system 150 includes an input coupler 152 that receives and transmits a pump beam $P_o$. The pump beam $P_o$ can be a single frequency beam at a desired wavelength provided from a pump 154. Alternatively, the pump 154 can provided the pump beam $P_o$ as a multimode beam, such as having a spectral linewidth below or near to the spectral acceptance bandwidth of the BPM crystal. The pump 154 can provide the pump beam $P_o$ at a wavelength, which may vary according to application requirements. The input coupler 152 allows transmission of the pump beam $P_o$ to a type II BPM element 156. For purposes of the following example, the OPO resonant signal wavelength is assumed to be 2.156 µm and the unresonated idler wavelength is assumed to be 2.100 µm and the pump wavelength is assumed to be 1.064 µm, although other wavelengths can be used. While in this case, the signal wavelength is longer than the idler (opposite of commonly used convention), the resonant wavelength is considered the signal and the unresonated wavelength is considered the idler. The input coupler (IC) is anti-reflective (AR) at the pump wavelength of 1.064 µm and is highly reflective (HR) at both 2.100 µm and 2.156 µm.

The BPM element 156 includes a pair of type II BPM crystals 158 and 160 in a WOC configuration. Those skilled in the art will understand and appreciate various different nonlinear crystals that can be configured to perform a type II BPM process, including the type II crystals mentioned herein. The input coupler 152 couples the pump beam $P_o$ to an input face 162 of the crystal 158. The type II crystal 158 performs nonlinear conversion via birefringent phase matching to produce the signal and idler at wavelengths that vary according to the internal angle of the crystal θ (see, e.g., FIG. 4).

Continuing with the convention introduced in FIG. 2, the pump polarization is ô with respect to the BPM crystal axes and oriented in the YZ plane with respect to an XZ cut Type II KTP crystal with angle φ=0. As discussed above, the type II crystal exhibits spatial walk off of the extraordinary beams relative to the ordinary beams at an angle ρ in the extraordinary plane. In the example of FIG. 8, the idler, $i_e$ is polarized in the ê plane, or XZ plane in the case of Type II KTP, and exhibits spatial walk off from the ô polarized pump and ô polarized signal. The signal $s_o$ and pump $P_o$ propagate through the crystal 158 (with ô polarization) substantially co-linearly. The idler beam $i_e$ exits the crystal 158 spatially separated from the signal beam $s_o$ and the pump beam $P_0$, but all beams propagate at substantially identical angles with respect to the crystal exit face. All output beams (signal $s_o$, idler $i_e$ and pump $P_0$), upon exiting from crystal 158 also propagate parallel to the direction of the original pump beam $P_0$, and such output beams are provided to an input face 164 of the second type II BPM crystal 160.

The second type II BPM crystal 160 is configured relative to the first crystal 158 to perform WOC, such as by rotating the second crystal about the X axis so that $d_{eff}$ has the same sign as the first crystal 158, the magnitude of the walk off angle |ρ| is identical, but the walk-off direction is exactly opposite. Such an arrangement of the type II BPM element 156 can be utilized to bring all three beams ($P_o$, $i_e$ and $s_o$) to propagate substantially co-linearly at the exit face 165 of the second crystal 160 provided that both crystals 158 and 160 are also the same length. The second type II QPM crystal thus produces a WOC set of substantially co-linearly propagating output beams having narrow linewidths (e.g., less than about 1 nm). For the example where KTP crystals are employed, the crystals 158 and 160 can be tuned to an internal angle of θ=50.940 so that the resonated 2.156 µm signal is ô polarized and the un-resonated 2.100 µm idler is ê polarized. Those skilled in the art will understand and appreciate that other WOC schemes or crystal arrangements that can be utilized to provide the type II BPM element 156. For example, the element 156 can be implemented as a single WOC type II BPM element constructed by diffusion bonding respective crystals having been cut to appropriate identical lengths and having identical desired internal angles.

The hybrid OPO 150 also includes a QPM element 166 that is co-located in the same cavity as the type II BPM element 156. The second crystal 160 of the type II BPM element 156 thus seeds the QPM element 166 with the WOC narrow linewidth output signals produced by the element 156. The QPM element 166 can be implemented as a nonlinear crystal 168 configured to perform quasi-phase matching, such as including the materials mentioned herein. For purposes of the following example, it is assumed that the nonlinear crystal is PPLN, although other QPM materials can be utilized. The PPLN crystal must be oriented such that the pump field orientation within the PPLN crystal 168 is aligned parallel to the ẑ axis in the extraordinary plane to take advantage of the highest nonlinear coefficient $d_{33}$. Also, each of the fields generated by the PPLN crystal 168 is polarized parallel to the pump $P_o$ with ê polarization with respect to the PPLN crystal. The ô plane with respect to the BPM crystals is the extraordinary ê plane in the reference frame of the PPLN crystal 168. Since the pump $P_o$ and resonated signal $s_o$ beam are both ô polarized in the reference frame of the BPM element 156, the PPLN crystal 168 can be rotated so that the ô polarization seen by the KTP enters the QPM element 166 as ê polarization in its reference frame.

Continuing with the above example of utilizing KTP crystals 158 and 160, the element 156 can produce an idler wavelength of 2.100 µm with ê polarization in the reference frame of the KTP crystals 158 and 160. The idler $i_e$ enters the PPLN crystal 168 with ô polarization, as seen from the reference frame of the PPLN crystal. The idler beam $i_e$ produced by the BPM element 156 is not amplified in the crystal 168, and thus does not contribute to the seeding effect since it does not interact with the pump and signal within the PPLN crystal. However, the resonant signal $s_o$ beam and pump $P_o$ are aligned in the ê plane of the PPLN. Therefore, the pump $P_o$ converts, as in a traditional PPLN OPO, while the narrow line signal from the type II KTP seeds the signal beam $s_o$ of the PPLN crystal 168, which is polarized the same. The seed photons cause the PPLN crystal 168 to experience preferential gain within the narrow linewidth seed bandwidth of the signal from the type II KTP element 156, disallowing the unwanted spectral regions normally produced within the signal band enough gain to grow. The corresponding idler band generated by the PPLN crystal 168 exhibits similar linewidth as the signal.

The QPM element 166 provides an amplified signal $S_o$, the idler $i_e$ and the depleted pump $P_0$ output to an output coupler 170. The output coupler 170 can be highly reflective at the pump wavelength, such that the pump beam is not produced at the output 174 of the output coupler. In this case, the reflected remaining pump traverses a second pass through the resonator to increase conversion efficiency of the OPO system 150. Continuing with the example wavelengths mentioned above, the input face 172 of the output coupler 170 can be highly reflective at the pump wavelength (e.g., 1.064 µm), anti-reflective at the idler wavelength (e.g., 2.100 µm) about and partially reflective at the signal wavelength (e.g., 2.156 µm). Thus, the resonant or 'signal' wavelength is 2.156 µm, and the un-resonated, or 'idler' wavelength is 2.100 µm. Those skilled in the art will appreciate that the crystals used in the respective elements 156 and 166 can be broad band AR (BBAR) coated for pump, signal and idler wavelength ranges according to application requirements. The signal reflectance of the output coupler 170 can be adjusted for optimum performance depending on which of the output beams is required to have more power.

Figure 9:
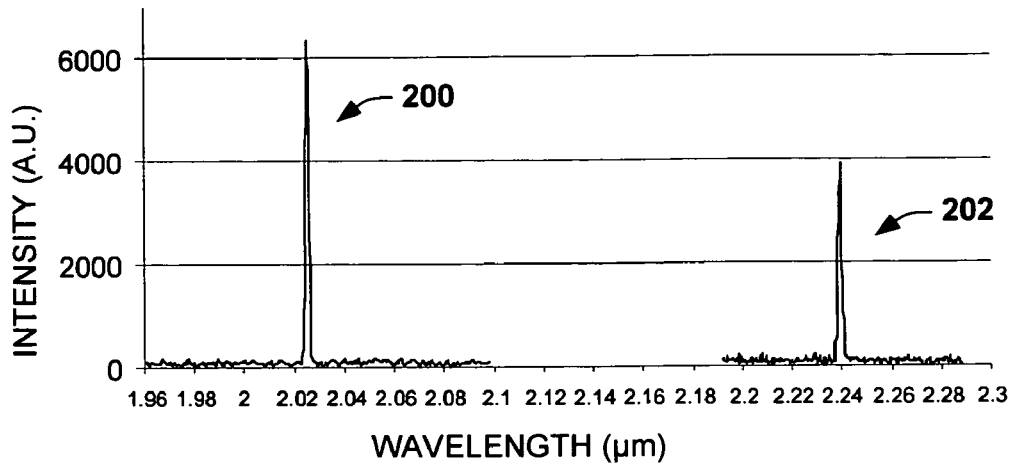
FIG. 9 is a graph depicting an example of bandwidth of output signals from a hybrid OPO implemented according to an aspect of the present invention.

FIG. 9 depicts an example of output beams 200 and 202 at arbitrarily chosen wavelengths that can be generated by a hybrid OPO implemented according to an aspect of the present invention. The intensity of the output beams 200 and 202 (in arbitrary units) is plotted as a function of wavelength. The output beam 200 corresponds to an unresonated idler beam of wavelength 2.020 µm and the output beam 202 corresponds to a resonated signal beam of wavelength 2.250 µm. From the example of FIG. 9, it is shown that the linewidths achieved by the hybrid OPO system are comparable to the narrow linewidths for the signal and idler achieved by the WOC type II BPM element (see, e.g., FIG. 3). Due to the high conversion efficiency of the QPM element, however, the intensity of the respective signal and idler provided by the hybrid OPO can be significantly higher than can be achieved by a type II BPM OPO. The majority of the energy that the PPLN would normally produce over a large spectral bandwidth is output within the narrow linewidth of the Type II BPM element.

By way of further example, the output signals 200 and 202 can and have been provided by an embodiment of the OPO system 150 of FIG. 8 implemented in the following manner. The crystals 158 and 160 were KTP crystals having dimensions 12 mm×12 mm×20 mm. The QPM element 166 was PPLN having dimensions of 1 mm×3 mm×15 mm, and a congruently grown sample, poled with poling gradient of approximately $\Lambda=31.3$ µm. The PPLN was operated at a temperature of approximately 392 Kelvin so that the center of its signal and idler output gain profiles coincided with the output signal and idler wavelengths of the KTP crystals. A Q-switched laser provided an average input pump power of 200 mW at 50 Hz (where 20 ns pulse energy=4 mJ). With such an arrangement, average signal power output from the hybrid OPO was approximately 23 mW (460 µJ). The average idler output was approximately 51 mW (1.02 mJ). These powers corresponded to approximately 11.5% power conversion into the signal and approximately 25.5% into the idler. The system 150 was also pumped with a 50 mW (1 mJ) pump with the same pulse format. The average signal power output from the hybrid OPO was approximately 3.3 mW (66 µJ). The average idler output was approximately 11.5 mW (230 µJ). These powers correspond to approximately 6.6% power conversion into the signal and approximately 23% into the idler. Other pump sources with high rep rates of several tens of kHz and different pulse widths can and have also been utilized. Gray tracking in the KTP was not observed and green induced infrared absorption (GRIIRA), as well as photorefraction can be reduced to negligible amounts with the use of MgO doped PPLN and other QPM crystals such as periodically poled stoichiometric lithium tantalate (PPSLT). The respective dimension and power levels are provided by way of example only.

Figure 10:
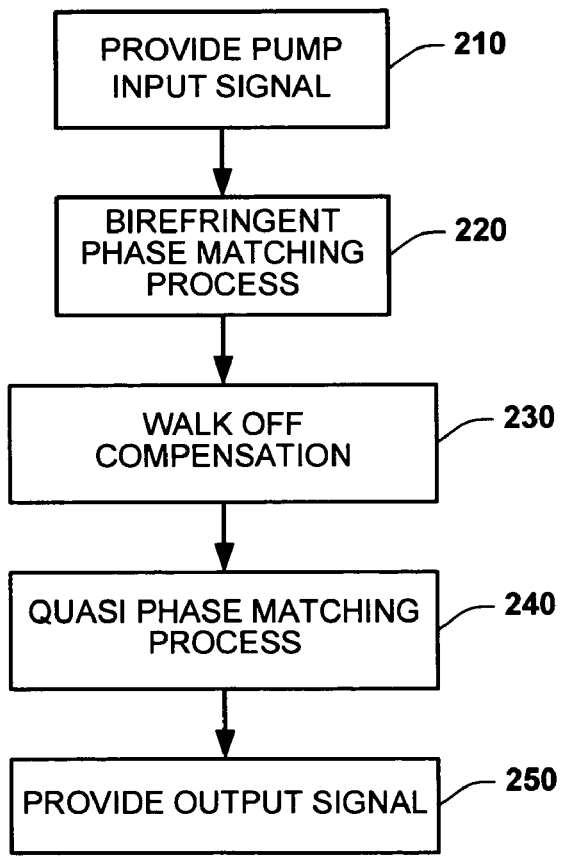
FIG. 10 is a flow diagram of a method that can be implemented according to an aspect of the present invention.

FIG. 10 depicts an example of a method that can be employed to perform optical parametric oscillation according to an aspect of the present invention. The method begins at 210 in which a pump input signal is provided. For example, the pump signal can be provided as a coherent signal from a Q-switched laser to an input coupler of an optical resonator. A BPM process is performed at 220 on the pump beam. For instance, the BPM process can be implemented by one or more type II BPM crystals located in the optical resonator. At 230, WOC is performed as part of the BPM process, such as by a pair of type II BPM crystals located in the optical resonator (e.g., see FIGS. 2 and 8).

At 240, a QPM process is performed, which process is seeded by the outputs from the type II BPM process (at 230) causing the system to see preferential gain at the seed wavelengths and within the seed bandwidths. For example, the QPM process can be implemented by one or more non-linear crystals that are co-located in the resonator with the BPM crystals and are configured to perform QPM. At 250, a corresponding output signal is provided from the optical resonator at a predetermined wavelength. Thus, the optical resonator is configured (e.g., by appropriate reflective and anti-reflective coatings) to provide for resonance of one or more certain wavelengths while propagating certain wavelengths through an output coupler, such as described herein.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A nonlinear frequency conversion system comprising:
   a first element that comprises a first gain medium configured to perform type II birefringent phase matching (BPM) of a pump beam to provide corresponding seed beams having at least first and second polarization states; and
   a second element comprising a second gain medium configured to perform quasi phase matching (QPM) of the seed beams, the second element amplifying at least one of the seed beams to provide corresponding output beams, at least one of the output beams having a predetermined wavelength that is different from the wavelength of the pump beam.

2. The system of claim 1, wherein the first element and the second element are co-located within an optical resonator to form an optical parametric oscillator (OPO) for performing parametric amplification and nonlinear conversion in response to the pump beam, the optical resonator being resonant at the wavelength for at least one of the seed beams and providing OPO output beams based on the output beams provided by the second element.

3. The system of claim 2, wherein the seed beams further comprise a signal beam and an idler beam, the optical parametric oscillator further comprising an input coupler and an output coupler, each of the input coupler and the output coupler being coated to provide for resonance at the wavelength of at least the signal beam within the optical resonator.

4. The system of claim 2, wherein second medium comprises a transparent nonlinear QPM crystal, each of the pump beam and the at least one resonant signal beam having a polarization selected according to an orientation of the QPM crystal having the highest nonlinear coefficient.

5. The system of claim 4, wherein the nonlinear QPM crystal comprises a periodically poled nonlinear crystal having a grating period, the grating period being set to provide the output beams at the predetermined wavelength of the output beam for a given temperature.

6. The system of claim 2, further comprising a pump that supplies a coherent input signal at a known input wavelength, such that the second medium produces the output beams as including a coherent output signal having the predetermined wavelength according to nonlinear conversion implemented by the first and second elements.

7. The system of claim 2, wherein the first medium comprises at least one transparent nonlinear BPM crystal and the second medium comprises at least one nonlinear QPM crystal, an anti-reflective coating disposed on an input face of the BPM crystal and a reflective coating being disposed on the output surface of the QPM crystal to define the optical resonator between the anti-reflective coating and the reflective coating, the anti-reflective coating and the reflective coating being selected according to the wavelength of the pump beam.

8. The system of claim 2, wherein relative gains of the first and second elements are balanced to operate the optical parametric oscillator at a threshold that approximates the threshold of the second element.

9. The system of claim 1, wherein the first element further comprises first and second type II BPM crystals arranged in a walk off compensation configuration to maintain substantial co-linearity of the seed beams that are provided to the second element, the seed beams each having a linewidth that is less than or equal to about one nanometer.

10. The system of claim 1, wherein the second medium further comprises a nonlinear QPM crystal having a length that is functionally related to an effective nonlinear coefficient of the first element.

11. The system of claim 1, wherein the predetermined wavelength of the output beam is in the mid infrared wavelength.

12. An optical parametric oscillator comprising:
an optical resonator having an input and an output, a pump beam being provided to the input of the optical resonator;
at least one type II birefringent phase matching (BPM) crystal located within the optical resonator and configured to provide corresponding BPM output beams having at least first and second polarization states in response to the pump beam; and
a quasi phase matching (QPM) crystal located within the optical resonator and being seeded by the BPM output beams, the QPM crystal amplifying the BPM output beams to provide corresponding QPM output beams, at least one beam of the QPM output beams propagating through the output of the optical resonator as at least one amplified output beam having a predetermined wavelength that is different from the pump beam.

13. The system of claim 12, wherein the at least one BPM crystal provides the BPM output beams as including a signal beam and an idler beam, each of the signal beam and idler beam having a wavelength determined by nonlinear conversion performed by the at least one BPM crystal, the optical parametric oscillator further comprising an input coupler and an output coupler, each of the input coupler and the output coupler being coated to provide for resonance at the wavelength of at least the signal beam.

14. The system of claim 13, the pump beam and the resonant signal beam each have a polarization selected according to an orientation of the QPM crystal that results in the highest nonlinear coefficient for the QPM crystal.

15. The system of claim 14, wherein the nonlinear QPM crystal comprises a periodically poled nonlinear crystal having a grating period, the grating period being set to provide the output signal at the predetermined wavelength of the output beam for a given temperature.

16. The system of claim 12, further comprising a pump that supplies the pump beam to the input of the optical resonator.

17. The system of claim 12, wherein the optical resonator is formed by respective coatings disposed on an input face of the BPM crystal and disposed on the output face of the QPM crystal, the respective coatings being selected according to the wavelengths of the pump beam and the BPM output beams.

18. The system of claim 12, wherein the at least on BPM crystal further comprises first and second BPM crystals arranged in a walk off compensated configuration to maintain substantial co-linearity of the BPM output beams that are provided to the QPM crystal, the BPM output beams having a linewidth that is less than or equal to about one nanometer.

19. The system of claim 12, wherein the predetermined wavelength of the amplified output beam resides in the mid infrared wavelength.

20. The system of claim 12, wherein relative gains of the at least one BPM crystal and the QPM crystal are balanced to operate the optical parametric oscillator at a threshold that approximates the threshold of the QPM crystal and provides the amplified output beam with a spectral bandwidth that approximates the spectral bandwidth of the BPM output beams.

21. The system of claim 12, wherein at least one of the at least one BPM crystal and the QPM crystal is tunable by at least one of angle tuning and temperature tuning to provide the at least one amplified output beam at the predetermined wavelength.

22. A method for providing optical parametric oscillation within an optical resonator, the method comprising:
receiving a pump beam having a pump wavelength;
performing type II birefringent phase matching on the pump beam to provide corresponding BPM output beams having at first and second polarization states, at least one of the BPM output beams having a predetermined wavelength;
performing quasi phase matching to amplify at least one of the BPM output beams to provide corresponding QPM output beams; and
providing at least one beam of the QPM output beams from the optical resonator as an amplified output beam having a predetermined wavelength that is different from the pump beam.

23. The method of claim 22, wherein the performing type II birefringent phase matching further comprises performing walk off compensation to align the BPM output beams substantially co-linearly with a linewidth that is less than or equal to about one nanometer.

* * * * *